Figure 4:
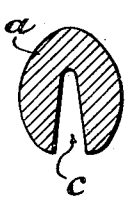

July 2, 1940.　　　　　P. PIEPER　　　　　2,206,365
HAIR DRESSING COMB
Filed Nov. 14, 1938
FIG. 1.
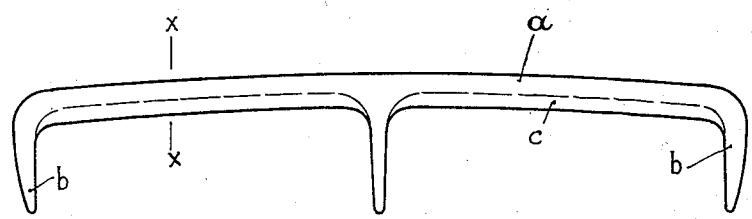
FIG. 2.　　　　　FIG. 3.
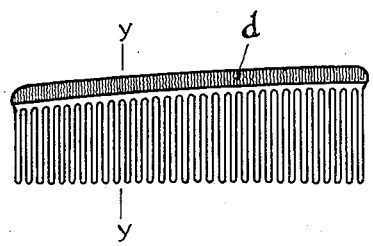 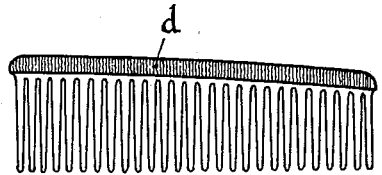

FIG. 6.
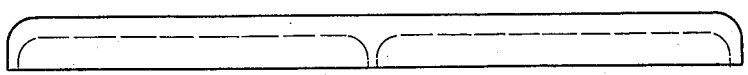

FIG. 8.
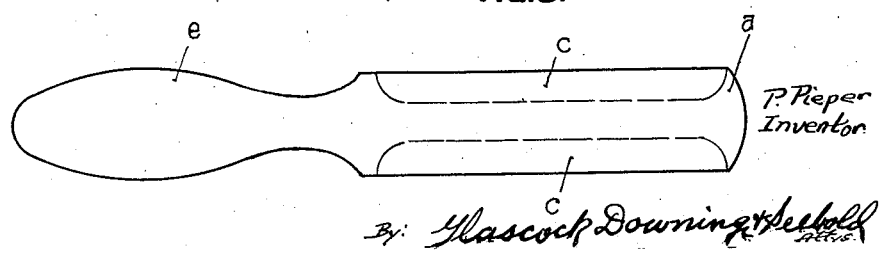
P. Pieper
Inventor
By: Glascock Downing & Seebold
Attys.

Patented July 2, 1940

2,206,365

UNITED STATES PATENT OFFICE 2,206,365

HAIR DRESSING COMB

Paul Pieper, Luxemburg, Luxemburg

Application November 14, 1938, Serial No. 240,419
In Luxemburg January 31, 1938

4 Claims. (Cl. 132—11)

Hair dressing and pocket combs have recently been made in desired shapes from moulding powders by heating, liquefying and pressing them in formers under heavy pressure. This new method of construction permits cheap mass production. Its disadvantage is however, that in a comb of the usual shape with coarse and fine teeth and a common back, the cross section of the material or aggregations of material vary considerably. Consequently, the period allowed for cooling off has to be determined according to the thickest cross section, i. e., the back of the comb, and unavoidable stresses are set up in the material, which enhance the danger of fracture when brittle material is used. Attempts have been made to overcome these difficulties by means of thin flat backs which, however, do not present a pleasing appearance and are not sufficiently rigid. Hitherto it has only been possible to produce the whole comb from a material, i. e., plastic powder, with a definite colour or mixture of colours and of a definite quality. It is desirable however, to impart greater elasticity and to give the teeth or sections of teeth a colour differing from that of the back of the comb which must be more rigid.

The object of the present invention is to overcome these difficulties by making the backs of the combs and the teeth portion in separate formers of material of differing quality or stretch or colours, thus an appropriate cooling off period can be allowed for each portion according to its cross section.

The time allowed for manufacturing may be thus regulated according to the material used and its cross section. Also the presses deliver faultless articles in less time and with the desired properties. The cooling off or solidifying periods are different even in the same cross section and depend upon the quality of the material and even upon the colour because these colour mixtures affect the specific weights and composition of the plastic powder.

The present invention permits the cooling off periods to be adjusted to the properties of the materials of which the individual parts are made in a manner hitherto impossible in the manufacture of moulded combs.

Compared with the known processes, the suggested assembly of the individually produced parts also offers techinical advantages. The comb inserts are furnished with thinner backs which cool off in the same time as the teeth. The backs of the combs in which the sections of teeth are inserted have a U-shaped cross section arranged according to the depth of the slot for receiving the narrow backs of the comb sections and they are of a cross section which is most favourable for cooling off and they have a greater tenacity and pleasing appearance. The production of individually moulded parts enables the manufacturing difficulties of moulded combs to be overcome.

The suggestion of making horn combs in two parts and joining them together by a metal strip has already been made. Horn combs made in one piece and strengthened by such metal strips have also been manufactured. It has also been suggested that the teeth should be inserted individually or in small sections in the back of the comb from above and to hold them there with a metal strip. Combs of all kinds have been subsequently ornamented with profiled metal backs or finished combs have been pasted with strips of different colours. All these attempts however, are superseded by the present invention which is adapted to the part manufacture of the recent production methods according to the moulding process from plastic powders, and enables the use of such powders in various qualities and colours for combs. The invention also overcomes the technical difficulties of variations in cross section and also the use of suitable moulding powders for each part with regard to quality and colour, with the practical requirements of the trade, stocks and popular demand.

According to the present invention, sections of teeth of any desired strength and distance apart, i. e., sections of teeth with 4 to 8 teeth per each 10 mms. can be produced in standard lengths of 3½″ to 4″ and from these pocket combs of this size or complete hair dressing combs of double size, i. e., 7″ to 8″ may be produced or assembled. These insert portions can also be inserted in comb holders. Thus combs with a definite number of teeth or colour or material can be assembled from standard individual parts according to requirements, i. e., according to orders on hand. Also combs with only coarse, medium or fine teeth may be assembled or combs in which any two of the above sections of teeth are used. The sections of teeth can be inserted in straight or undulated comb backs, in pocket, double or in handled comb backs. The colours may be mixed as desired, for example, the back of the comb may be black, and the sections of teeth white, thus with very few formers and models all tastes and requirements may be met.

The insert combs may be fixed in the back of the comb, either by a separate means which is suitable to the material so that so solid homogeneous comb results which cannot be taken apart after assembly, or the connection may be effected by detachable clamping means. In the latter method of attachment, the assembly must obviously be sufficiently strong to prevent the teeth sections from becoming accidentally released from the back of the comb when in use. This embodiment of the present invention does not necessitate the comb being assembled at the works from standard parts because the dealer himself can assemble it in his shop as desired by the customer. This can be done because the individual parts were made in the same formers.

The invention thus combines all the advantages of rational manufacture and simplified storing with the possibility of supplying all the individual requirements of customers, and damaged combs may be quickly and cheaply repaired.

In the accompanying drawing several embodiments of the invention are illustrated by way of example.

Figure 5:
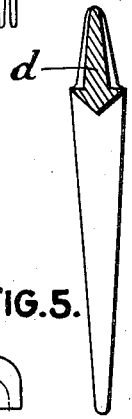

Figure 1 shows the back $a$ of a comb with the usual strengthened end and centre teeth $b$ and the recess $c$, which for example may be of an almost rectangular cross section which broadens out slightly outwardly. Figures 2 and 3 show sections of teeth of varying strength, the upper parts of which are so shaped that they fit into the recess $c$. Figure 4 shows recess $c$ in section on the line $x$—$x$ of Figure 1. Figure 5 is a sectional view of a tooth taken on the section line $y$—$y$ of Figure 2. The back of the individual sections of teeth is formed so that it fits closely and tightly in the recess and is held there with a definite clamping effect. In order to strengthen this clamping effect, if detachably assembled combs are concerned, vertically running small teeth or ribs may be provided on the back $d$ (Fig. 5) as shown by the section taken on the line $y$—$y$ (Fig. 2). This is a means for assuring that the inserts according to Figures 2 and 3 are securely held in the recesses $c$ so that they can only be dislodged by exercising considerable force, but do not become detached during ordinary use. The recesses $c$ may also be provided with corresponding ribs into which the small teeth engage. The teeth and ribs may be made so small that the clamping effect is thereby increased and between said teeth and the back $d$ and the ribs, an intermediate layer of flexible material such as tow fibres, blotting paper, etc., may be inserted in the recesses $c$ so as to increase the gripping effect. Also small metal strips may be clamped in between. In short, there are a great variety of ways of effecting a detachable yet reliable connection between the sections of teeth and the back of the comb. It is generally sufficient, however, to adjust the strength of the insert back to the ribs in the comb proper.

Figures 1 to 5 illustrate a comb in which the back $a$ is slightly arched and the recesses $c$ are also so shaped and consequently the insert sections of teeth must be made so that the teeth are shorter at the ends.

Figure 7:
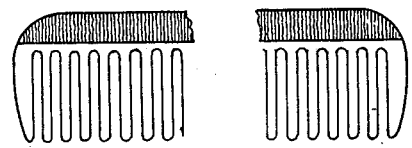

Figure 6 shows a comb with a straight back in which the method of fixing the teeth is the same as before and as shown in Figure 7, the insert sections of teeth for this back are also straight with teeth of uniform length. A slightly arched back with similarly shaped recesses, the inserts of which have straight backs, may also be used. In the back according to Figure 6 the strengthened end teeth are omitted as they are provided on the ends of the insert sections of teeth as shown by Figure 7.

Figure 8 illustrates a back with an additional oppositely arranged recess $c$ in which the insert sections of teeth are put in from above and below. This back may be made either with or without a handle. All these various modifications and embodiments come within the scope of the invention.

Having now particularly described and ascertained the nature of my said invention and in what manner the same is to be performed, I declare that what I claim is:

1. The process for making a comb comprising injecting a synthetic resin into a mold to form a toothed element, cooling and setting said element uniformly to avoid stresses therein, injecting a synthetic resin into another mold to form a back member having a groove therein, cooling and setting said member uniformly to avoid stresses therein and finally frictionally engaging the toothed element within the groove of said back member to form a comb.

2. A process as claimed in claim 1 and further comprising the step of applying a resin solvent to the surfaces to be frictionally engaged, whereby a rigid engagement is effected when the solvent evaporates.

3. A comb comprising at least one toothed element and a separate back member having a groove therein for frictionally receiving said toothed element, the toothed element and back member consisting of stress-free synthetic resinous material.

4. A comb as claimed in claim 3 wherein the groove of the back member is closed at each end.

PAUL PIEPER.